US012590900B2

(12) United States Patent
Yang et al.

(10) Patent No.: US 12,590,900 B2
(45) Date of Patent: Mar. 31, 2026

(54) WAFER INSPECTION APPARATUS USING THREE-DIMENSIONAL IMAGE AND METHOD OF INSPECTING WAFER USING THE SAME

(71) Applicant: Samsung Electronics Co., Ltd., Suwon-si (KR)

(72) Inventors: Yusin Yang, Seoul (KR); Sungyoon Ryu, Seoul (KR); Younghoon Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 17/881,367

(22) Filed: Aug. 4, 2022

(65) Prior Publication Data

US 2023/0184691 A1 Jun. 15, 2023

(30) Foreign Application Priority Data

Dec. 15, 2021 (KR) ........................ 10-2021-0179975

(51) Int. Cl.
| | |
|---|---|
| *G01N 21/88* | (2006.01) |
| *G01N 21/95* | (2006.01) |
| *G01N 21/956* | (2006.01) |
| *G06T 7/00* | (2017.01) |

(52) U.S. Cl.
CPC ..... *G01N 21/8806* (2013.01); *G01N 21/9501* (2013.01); *G01N 21/956* (2013.01); *G06T 7/0004* (2013.01); *G01N 2021/8835* (2013.01); *G01N 2021/8848* (2013.01); *G01N 2021/8887* (2013.01); *G06T 2200/04* (2013.01); *G06T 2207/10012* (2013.01); *G06T 2207/10148* (2013.01); *G06T 2207/10152* (2013.01); *G06T 2207/30148* (2013.01)

(58) Field of Classification Search
CPC .......... G01N 21/8806; G01N 21/9501; G01N 21/956; G01N 2021/8835; G01N 2021/8848; G01N 2021/8887; G01N 2021/8845; G01N 21/8851; G06T 7/0004; G06T 2200/04; G06T 2207/10012; G06T 2207/10148; G06T 2207/10152; G06T 2207/30148; G06T 7/571; G06T 2207/10141; G01B 2210/56; G01B 11/24
See application file for complete search history.

(56) References Cited

U.S. PATENT DOCUMENTS

| | | | |
|---|---|---|---|
| 9,418,199 B2 | 8/2016 | Hu et al. | |
| 9,780,004 B2 | 10/2017 | Greene | |
| 9,995,648 B2 * | 6/2018 | Shchekin ........... | G01N 21/9501 |
| 10,146,036 B2 | 12/2018 | Dhagat et al. | |
| 10,393,672 B2 * | 8/2019 | Ahn ..................... | G02B 21/002 |
| 10,483,081 B2 | 11/2019 | Park et al. | |
| 10,515,444 B2 | 12/2019 | Lin et al. | |

(Continued)

*Primary Examiner* — Jonathan M Hansen

(74) *Attorney, Agent, or Firm* — Muir Patent Law, PLLC

(57) ABSTRACT

A wafer inspection apparatus includes: a stage configured such that a wafer is arranged on the stage; an optical apparatus configured to align the wafer on the stage and generate an optical intensity image including an optical intensity profile; a focus adjusting unit configured to align light incident onto the wafer to be in-focus; and an image processor configured to integrate the optical intensity image with vertical level data of the in-focus to generate and analyze a three-dimensional (3D) image.

15 Claims, 6 Drawing Sheets

100

(56)         References Cited

U.S. PATENT DOCUMENTS

| | | | |
|---|---|---|---|
| 10,692,690 B2 | 6/2020 | Anantha et al. | |
| 2014/0315330 A1* | 10/2014 | Fujimori | G03F 7/70641 |
| | | | 356/121 |
| 2015/0062370 A1* | 3/2015 | Shroff | G06T 7/571 |
| | | | 348/222.1 |
| 2015/0356726 A1* | 12/2015 | Fukazawa | G06T 7/0008 |
| | | | 382/149 |
| 2019/0289218 A1* | 9/2019 | Liu | G06T 7/571 |
| 2021/0396510 A1* | 12/2021 | Kim | G01N 21/8851 |

* cited by examiner

WAFER INSPECTION APPARATUS USING THREE-DIMENSIONAL IMAGE AND METHOD OF INSPECTING WAFER USING THE SAME

CROSS-REFERENCE TO RELATED APPLICATION

This application is based on and claims priority under 35 U.S.C. § 119 to Korean Patent Application No. 10-2021-0179975, filed on Dec. 15, 2021, in the Korean Intellectual Property Office, the disclosure of which is incorporated by reference herein in its entirety.

BACKGROUND

The inventive concept relates to a wafer inspection apparatus and a method of inspecting a wafer using the wafer inspection apparatus, and more particularly, to a wafer inspection apparatus capable of detecting a defect that occurs on a wafer and a method of inspecting a wafer using the wafer inspection apparatus.

According to sophisticated and complicated semiconductor process of recent days, defects affecting yield also have become diversified in their types. However, as a general wafer inspection method or apparatus only provides lateral information about a position of a defect, which lacks information about a depth direction of the defect, it is difficult to accurately monitor defects. Recently, due to ultra-micronized patterns on a wafer, an inspection on defects beyond the measurement limit of optical inspections on defects has been required, and accordingly, new methods to monitor a wafer have been studied.

SUMMARY

The inventive concept provides a wafer inspection apparatus using a three-dimensional (3D) image, wherein the wafer inspection apparatus is capable of accurately performing at high speed a 3D inspection on patterns on a wafer by obtaining a 3D image on the wafer and inspecting the wafer using the 3D image, and a method of inspecting a wafer by using the wafer inspection apparatus.

According to an aspect of the inventive concept, there is provided a wafer inspection apparatus including: a stage configured that a wafer is arranged on the stage; an optical apparatus configured to align the wafer on the stage and generate an optical intensity image including an optical intensity profile; a focus adjusting unit configured to align light incident onto the wafer to be in-focus; and an image processor configured to integrate the optical intensity image with vertical level data of the in-focus to generate and analyze a 3D image.

According to another aspect of the inventive concept, there is provided a wafer inspection apparatus including: a stage configured such that a wafer is arranged on the stage, the state configured to move for scanning; an optical apparatus configured to align the wafer on the stage and generate an optical intensity image including an optical intensity profile; a focus adjusting unit configured to align light incident onto the wafer to be in-focus; an image processor configured to integrate the optical intensity image with vertical level data of the in-focus to generate and analyze a 3D image; and a controller configured to control the stage, the optical apparatus, the focus adjusting unit or the image processor, wherein the optical apparatus includes an optical system configured to render light incident onto the wafer and a sensor configured to receive light reflected from the wafer, and the stage configured to move to align the light to be in-focus.

According to another aspect of the inventive concept, there is provided a method of inspecting a wafer, the method including: arranging a wafer on a stage; aligning the wafer on the stage using an optical apparatus configured to generate an optical intensity image including an optical intensity profile; after incidence of light onto the wafer, adjusting the light incident onto the wafer to in-focus; generating a 3D image of a top surface of the wafer; and analyzing the 3D image, wherein the 3D image is generated by integrating the optical intensity image and vertical level data of the in-focus.

BRIEF DESCRIPTION OF THE DRAWINGS

Embodiments of the inventive concept will be more clearly understood from the following detailed description taken in conjunction with the accompanying drawings in which:

FIG. 5 is a block diagram of a wafer inspection apparatus according to an embodiment.

DETAILED DESCRIPTION OF THE EMBODIMENTS

Figure 1:
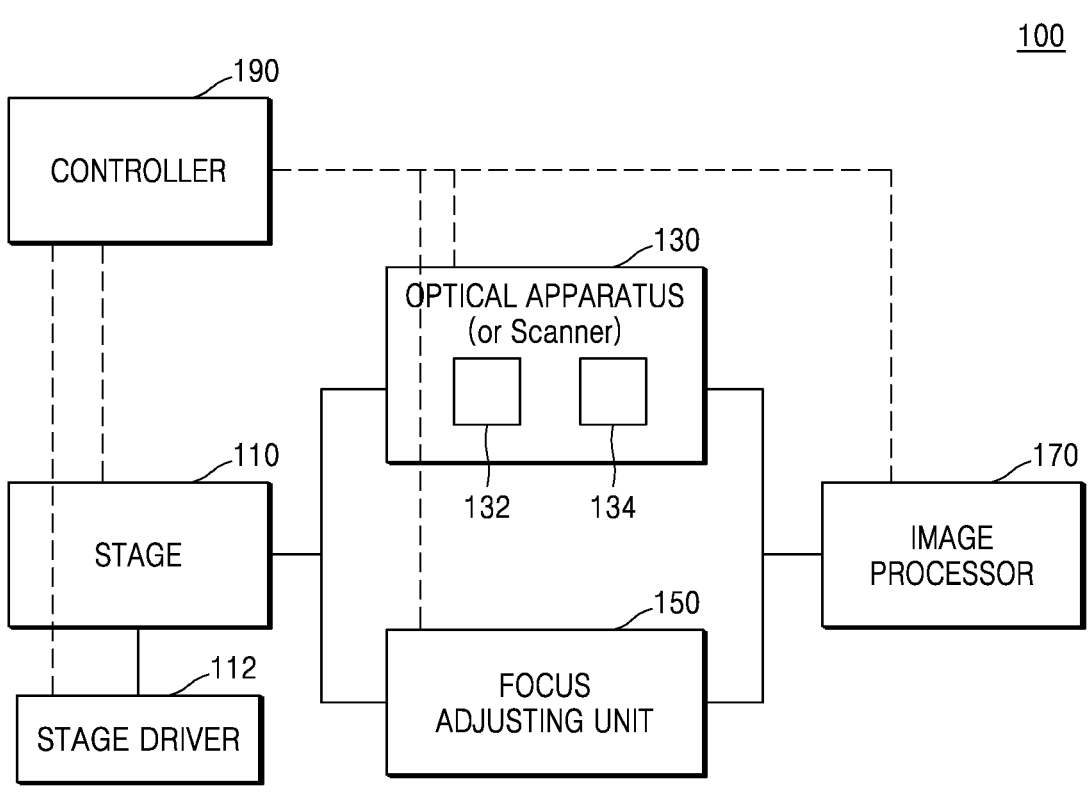
FIG. 1 is a block diagram of a wafer inspection apparatus according to an embodiment.

Hereinafter, embodiments of the technical idea of the inventive concept are described in detail with reference to the accompanying drawings. Like reference numerals in the drawings denote like elements, and thus redundant descriptions will be omitted.

Figure 2:
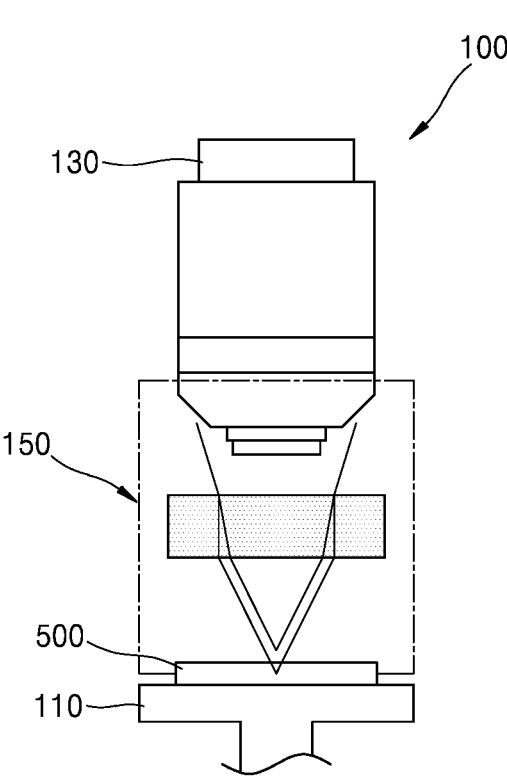
FIG. 2 is a schematic diagram of the wafer inspection apparatus of FIG. 1.

FIG. 1 is a block diagram of a wafer inspection apparatus 100 according to an embodiment. FIG. 2 is a schematic diagram of the wafer inspection apparatus 100 of FIG. 1. In FIG. 1, the dashed lines indicate paths of an optical signal.

With reference to FIGS. 1 and 2, the wafer inspection apparatus 100 of the embodiment may include a stage 110, an optical apparatus 130, a focus adjusting unit 150, an image processor 170, and a controller 190.

The wafer inspection apparatus 100 may integrate an optical intensity image including an optical intensity profile of the optical apparatus 130 with vertical level data of in-focus of light incident onto a wafer 500, generated by the focus adjusting unit 150 to generate a three-dimensional (3D) image for a surface of the wafer 500. By using the 3D image, the wafer inspection apparatus 100 may easily analyze a defect formed on the surface of the wafer 500.

The stage 110 may be a device to fix/hold and support the wafer 500, which is a subject to an inspection, and at the time of inspection, the wafer 500 may be arranged on the stage 110, and the stage 110 may move the arranged wafer 500 in a first and a second horizontal directions (X direction and Y direction) and/or in a vertical direction (Z direction). Furthermore, the stage 110 may rotate around a Z axis on an X-Y plane, or rotate around an axis on the X-Y plane, for example, a first horizontal axis (X axis) or a second horizontal axis (Y axis), on a Y-Z plane or an X-Z plane.

The wafer 500 may be arranged on the stage 110 by a vacuum fixation method (e.g., vacuum adsorption), etc. For example, the stage 110 may be a vacuum chuck. Here, the wafer 500 is described as a subject of inspection; however, the subject of inspection is not limited thereto, and various semiconductor devices which require a 3D inspection, such as a semiconductor package, a semiconductor chip, a display panel, etc. may be the subject of inspection.

A stage driver 112 may move the stage 110 in the first and second horizontal directions (X direction and Y direction) and/or in the vertical direction (Z direction). Moreover, the stage driver 112 may rotate the stage 110. The stage driver 112 may move the stage 110 so that the wafer 500 is aligned with the optical apparatus 130 and/or the light is arranged in-focus.

The optical apparatus 130 may align an optical system 132 and/or a sensor 134 with the wafer 500. Moreover, the optical apparatus 130 may receive light reflected from the wafer 500 to obtain an image regarding patterns formed on the wafer 500. The optical apparatus 130 may include the optical system 132 and the sensor 134. For example, the optical apparatus 130 may obtain a 2D image on the wafer 500 (e.g., a 2D image of a top surface of the wafer 500) and extract an optical intensity profile to generate an optical intensity image on the wafer 500 (e.g., an optical intensity image of a top/front surface of the wafer 500).

For example, the optical apparatus 130 may obtain an image regarding the wafer 500 (e.g., an image of a top/front surface of the wafer 500) through scanning by using the sensor 134. The scanning may be implemented by movement of the optical apparatus 130 or movement of the wafer 500 by the stage 110. For example, in the wafer inspection apparatus 100 of the embodiment, the scanning of the optical apparatus 130 may be implemented by the movement of the stage 110.

Although it is not shown in FIGS. 1 and 2, the optical apparatus 130 may include an iris (not shown). The iris may adjust an amount of light entering the optical apparatus 130. Moreover, the iris may change a position of focus of the light entering the optical apparatus 130.

The optical apparatus 130 may change a position of focus of light incident onto the wafer 500 to an in-focus position by using the focus adjusting unit 150 and scan the wafer 500. In this manner, the optical apparatus 130 may obtain image data according the in-focus position with respect to the wafer 500, which is a subject of inspection. For example, the optical apparatus 130 may obtain in-focus image data of the wafer 150 by adjusting the position of focus of the incident light.

The optical system 132 may radiate light to the wafer 500, and transmit light reflected from the wafer 500 to the sensor 134. The optical system 132 may generate light of a required wavelength and render the light incident onto the wafer 500. The optical system 132 may generate and output incident light of multiple wavelengths and/or mono-wavelengths. For example, the optical system 132 may generate and output coherent light. The coherent light may refer to light causing interference, such as constructive interference or destructive interference, depending on a phase difference of light waves when two or more pieces of light overlap. For example, the optical system 132 may include a light source and a monochromator. Alternatively, the light source may generate and output broadband light. The monochromator may convert broadband light into monochromatic light and output the monochromatic light. The optical system 132 may convert broadband light emitted from the light source into monochromatic light and output the monochromatic light. According to an embodiment, the optical system 132 may include a plurality of point sources each of which outputting a monochromatic light. The optical system 132 may further include a collimator. The collimator may correct a path of incident light to be substantially parallel.

Terms such as "parallel," "same," "equal," "planar," or "coplanar," as used herein encompass identicality or near identicality including variations that may occur, for example, due to manufacturing processes. The term "substantially" may be used herein to emphasize this meaning, unless the context or other statements indicate otherwise.

The optical system 132 may output light of a non-continuous spectrum, such as light spectrums emitted from a sodium lamp, a mercury lamp, etc. According to some embodiments, the optical system 132 may be a laser configured to generate and output a laser beam. According to some embodiments, the optical system 132 may be any one of a gas laser, such as a helium-neon laser, a xenon laser, a carbon-dioxide laser, etc., a solid-state laser, such as a ruby crystal laser, a yttrium aluminum garnet (YAG) laser, etc., and a semiconductor laser, such as a gallium arsenide (GaAs) laser, an indium phosphide (InP) laser, etc. For example, the optical system 132 may generate and emit light having a wavelength of about 150 nm to about 500 nm. For example, the optical system 132 may emit light having a wavelength of deep ultraviolet (DUV) or UV light.

Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

The sensor 134 may receive light reflected from the wafer 500 to obtain images. The sensor 134 may include a plurality of photoelectric transformation units arranged in the form of a matrix, vertical and/or horizontal transmission lines moving charges from the plurality of photoelectric transformation units and initiating reading of an image signal, etc. The sensor 134 may include or may be one of various types of sensors, for example, image sensors. For example, the sensor 134 may include or may be a charge-coupled device (CCD) sensor, a complementary metal oxide semiconductor (CMOS) sensor, a time delayed integration (TDI) sensor, a photo multiplier tube (PMT) sensor, a photo diode (PD) array sensor, and/or a line scan CCD sensor.

The focus adjusting unit 150 may change a position of focus of light radiated to the wafer 500. The focus adjusting unit 150 may adjust a path of the light radiated to the wafer 500 so that the optical apparatus 130 may scan in-focus images in each area of the wafer 500. For example, when a surface of the wafer 500 or a plane in the wafer 500, which is a subject of inspection, is an in-focus position in which a focus is formed, the optical apparatus 130 may scan the wafer 500 in the in-focus position. The focus adjusting unit 150 may be arranged/disposed in the optical apparatus 130 or outside the optical apparatus 130. For example, the focus adjusting unit 150 may have an auto focus function to automatically adjust a focus of light radiated to the wafer 500 to an object. The object may be the surface of the wafer 500.

For example, the focus adjusting unit 150 may adjust the focus of the light by using a position in which an image IM (see FIG. 3A) of light radiated from the optical apparatus 130 to the wafer 500 and reflected from the wafer 500 is generated. However, the above is merely an example, and the method of adjusting a focus by the focus adjusting unit 150 is not limited thereto. In another embodiment, the focus adjusting unit 150 may adjust the focus of the light by using a time required for the light radiated to the wafer 500 to return to the sensor 134. For example, the focus adjusting unit 150 may adjust the focus of the light by a time of flight (TOF) method. The focus adjusting unit 150 may generate vertical level data of the in-focus state in each position on the surface of the wafer 500.

The focus adjusting unit 150 may be arranged between the stage 110 and the optical apparatus 130 outside the optical apparatus 130. The focus adjusting unit 150 may obtain vertical level data of the in-focus of the light incident onto the wafer 500 in a process of changing/adjusting the focus of the light incident onto the wafer 500 to the in-focus.

According to another embodiment, the focus adjusting unit 150 may be arranged between lenses included in the optical system 132. In certain embodiments, the focus adjusting unit 150 may be arranged in the optical system 132 and function as a part of the optical system 132.

The image processor 170 may integrate the optical intensity image of the optical apparatus 130 with the vertical level data of the in-focus generated by the focus adjusting unit 150 to generate a 3D image. Also, by comparing and analyzing the generated 3D images, a 3D defect inspection may be performed with respect to the wafer 500. For example, a range of vertical resolution of the image processor 170 may be less than or equal to about 20 nm. Also, a range of horizontal resolution of a 3D image of the image processor 170 may be less than or equal to about 10 nm. Accordingly, the wafer inspection apparatus 100 may identify a defect having a vertical height less than or equal to about 20 nm and/or a horizontal width less than or equal to about 10 nm.

The controller 190 may control all operations of the wafer inspection apparatus 100, a signal flow between the components of the wafer inspection apparatus 100, and process data. For example, the controller 190 may receive a signal of the focus adjusting unit 150 and move the stage 110 and/or the optical system 132. For example, in a point on the wafer 500, to form/accomplish in-focus of incident light, the controller 190 may control the stage driver 112 and further control the wafer 500 to be arranged in the in-focus position of the incident light.

The controller 190 may be implemented by hardware, firmware, software, or a combination thereof. For example, the controller 190 may be a computing device, such as a workstation computer, a desktop computer, a laptop computer, a tablet computer, etc. For example, the controller 190 may include a memory device, such as read only memory (ROM), random access memory (RAM), etc. and a processor configured to perform certain operations and algorithms, for example, a microprocessor, a central processing unit (CPU), a graphics processing unit (GPU), etc. Also, the controller 190 may include a receiver to receive an electric signal and a transmitter to transmit an electric signal.

The wafer 500 may include or be formed of, for example, silicon (Si). The wafer 500 may include or be formed of an element semiconductor, such as germanium (Ge), or a compound semiconductor, such as silicon carbide (SiC), gallium arsenide (GaAs), indium arsenide (InAs), and/or indium phosphide (InP).

According to some embodiments, the wafer 500 may have a silicon-on-insulator (SOI) structure. The wafer 500 may include a buried oxide layer formed on a front surface of the wafer 500. According to some embodiments, the wafer 500 may include a conductive area formed on the front surface of the wafer 500, for example, a well doped with impurities. For example, the front/top surface of the wafer 500 may be an active surface of the wafer 500. According to some embodiment, the wafer 500 may have various element isolation structures, such as shallow trench isolation (STI) isolating the doped wells from each other.

A semiconductor device formed in the wafer 500 may be any one of a memory device and a non-memory device. According to some embodiments, the memory device may be non-volatile NAND-type flash memory. According to some embodiments, the memory device may include or may be phase-change RAM (PRAM), magnetic RAM (MRAM), resistance RAM (ReRAM), ferroelectrics RAM (FRAM), NOR flash memory, etc. In certain embodiments, the memory device may be a volatile memory device of which data is lost when the power is down, such as DRAM, SRAM, etc. According to some embodiments, the semiconductor device may be a logic chip, a measuring device, a communication device, a digital signal processor (DSP), a system-on-chip (SOC), etc.

To form various types of semiconductor devices described above, a plurality of material layers may be deposited and patterned on the wafer 500. A plurality of patterns formed on the wafer 500 may accumulate and overlap to constitute a semiconductor device. Data regarding predesign of patterns of each layer to form the semiconductor device may be referred to as a circuit design layout, and the circuit design layout may be stored in a file form of, for example, graphic data system (GDS) II, Caltech intermediate form (CIF), etc.

In the wafer inspection apparatus 100 of the embodiment, the image processor 170 may integrate the optical intensity image of the optical apparatus 130 with the vertical level data of in-focus of the focus adjusting unit 150. The principles by which the image processor 170 integrates the data to generate 3D images and analyzes the 3D images to detect a defect are described in detail below.

First, the optical apparatus 130 may scan the surface of the wafer 500 to generate an optical intensity image. When the surface of the wafer 500, which is a subject of inspection, or a plane in the wafer 500 is defined as an in-focus position in which a focus is formed, the optical apparatus 130 may scan the wafer 500 in the in-focus position.

The optical apparatus 130 may first scan the wafer 500 to obtain 2D optical images. The 2D optical images may be digital images on which a digital signal processing has been performed. The 2D optical images may be transmitted to an image processor in which digital signal processing algorithms are set, for example, a computer for analysis. Then, optical intensity profiles may be extracted from each of the 2D optical images according to a focus position with respect to any one of fixed second horizontal axis (Y axis) values. The optical intensity profile may be extracted from the 2D optical images by using certain algorithms set in the computer for analysis.

Afterwards, the optical apparatus 130 may integrate the optical intensity profiles to generate the optical intensity image. For example, the optical intensity image may be implemented by allocating a color corresponding to an optical intensity on the X-Z plane. Here, the allocated colors are merely relative values corresponding to optical intensities, and may not represent exact values. For example, the colors may not represent actual color but may represent certain intensities.

For example, in a rectangular optical intensity image, a first horizontal axis (X axis) may be a direction the scanning is proceeded, and a vertical axis (Z axis) may be a direction corresponding to a focus position change, i.e., a depth direction of the focus. Furthermore, an optical intensity image about a fixed second horizontal axis (Y axis) may include information about a depth, i.e., the vertical axis (Z axis), and thus may also be regarded as a 3D image described above. For example, images and graphs representing 2D images and/or 3D images may vary depending on formats of the representation and/or systems processing the data.

The vertical level data of in-focus state of incident light measured by the focus adjusting unit 150 may be obtained by the following method. The focus adjusting unit 150 may perform focusing by which the incident light is positioned in the in-focus position with respect to the surface of the wafer 500. For example, the focusing may be auto focusing. While the focusing is performed, the focus adjusting unit 150 may integrate vertical level data of in-focus at each point of the surface of the wafer 500. The vertical level data may include information about a vertical level of the surface of the wafer 500, and thus the image processor 170 may generate a 3D image of the surface of the wafer 500. For example, the image processor 170 may integrate the optical intensity images of the optical apparatus 130 with the vertical level data of in-focus of the focus adjusting unit 150 to generate the 3D image of the surface of the wafer 500.

Then, when images of the wafer 500 are obtained by performing the scanning using the vertical level data, etc. of in-focus of the focus adjusting unit 150, depth information of a defect may be obtained through the following process. For example, an in-focus position of a height in the vertical direction (Z direction) at a point on the wafer 500 may be a reference height. For example, a part where a defect exists may be set as the in-focus position, or the surface of the wafer 500 may be set as the in-focus position. As the part where a defect exists may not be identified clearly, in general, the surface (e.g., the top surface) of the wafer 500 is set as the in-focus position. The image processor 170 may integrate the vertical level data of in-focus with respect to the front/top surface of the wafer 500 to obtain a 3D image.

The optical intensity image obtained through the optical apparatus 130 and/or the vertical level data of in-focus of the focus adjusting unit 150 may be compared with the optical intensity image and/or the vertical level data stored in a library. The optical intensity image and/or vertical level data stored in the library may be distinguished/identified based on various references, such as a type of the wafer 500, a position of a defect on the X-Y plane, a depth of a defect, etc.

The optical intensity image and/or vertical level data stored in the library may be data obtained through simulation or experiment conducted with respect to the wafer 500. Furthermore, a scanning electron microscope (SEM) analysis or a transmission electron microscope (TEM) analysis may be performed on the wafer 500, and based on a result of the SEM analysis or the TEM analysis, a new optical intensity image and/or vertical level data to be compared may be generated or the existing optical intensity image and/or vertical level data, which is subject to comparison, may be changed and updated. For example, when there is a significant difference between a result of the SEM analysis or the TEM analysis and data obtained through simulation, etc., the data obtained through simulation, etc. may be deleted or updated for change/correction.

The method of analyzing the 3D image by the image processor 170 is described below. By using the 3D images obtained through the foregoing processes, the image processor 170 may divide the wafer 500 into a plurality of care areas. The plurality of care areas may be sorted based on the optical intensity image of the optical apparatus 130 and/or the vertical level data of in-focus of the focus adjusting unit 150. The image processor 170 may set wafer inspection parameters per each care area to inspect a defect. The wafer inspection parameters may be different per each care area. The wafer inspection parameter may include a wavelength of light, a polarization state, an amount of light, a vertical level of a focus, an angle of incidence, and/or an angle of reflection. For example, the wafer inspection parameters may be different depending on a type of a defect.

While the 3D image is analyzed, the focus adjusting unit 150 may additionally generate vertical level data of in-focus of incident light with respect to the surface of the wafer 500. For example, while the image processor 170 analyzes any one of the plurality of care areas, the focus adjusting unit 150 may generate vertical level data of in-focus of incident light with respect to a care area to update wafer inspection parameters for the care area.

A general wafer inspection apparatus (e.g., apparatus of prior art) may remove a defect by using a 2D image of a wafer. Accordingly, when there are defects having different depths in the same position on a horizontal plane (X-Y plane), by obtaining an image of the wafer through a general scanning obtaining a 2D image, only substantially the same optical signals may be obtained regardless of the depth of the defects. For example, through a general scanning, only lateral information of a defect may be obtained, excluding/ without depth information of the defect. Accordingly, to obtain depth information of the defect, a general wafer inspection apparatus may need an additional/separate piece of equipment to obtain a 3D image.

As the general wafer inspection apparatus has a difficulty in generating or cannot generate a 3D image of a surface of a wafer, a defect inspection may be performed by rendering light incident onto the wafer and using scattered light. However, due to reduced sizes of defects, the method of inspecting a wafer by using light scattered from the surface of the wafer has become relatively inefficient.

On the contrary, the wafer inspection apparatus 100 according to the embodiment may generate and analyze a 3D image of the wafer 500 to perform a 3D defect inspection on the wafer 500.

The wafer inspection apparatus 100 according to the embodiment may include the image processor 170 configured to generate and analyze a 3D image of the wafer 500 by using the optical intensity image of the optical apparatus 130 and/or the vertical level data of in-focus of the focus adjusting unit 150 to obtain images of the wafer 500. Accordingly, by generating and analyzing a 3D image of the wafer 500 without including an additional component, the wafer inspection apparatus 100 according to the embodiment may perform the 3D defect inspection on the wafer 500. Therefore, the reliability of the wafer inspection apparatus 100 may be improved.

Figure 3A:
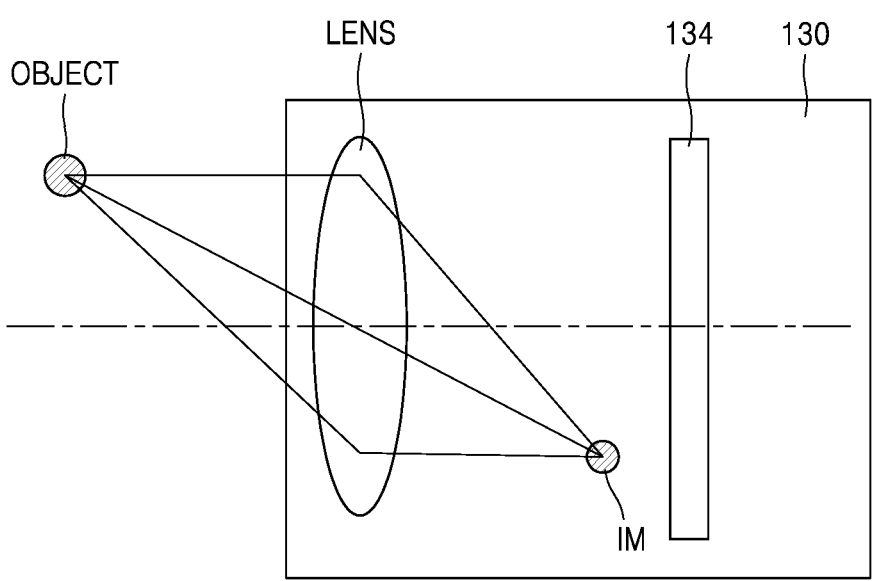
FIGS. 3A and 3B are diagrams illustrating examples of operations of a focus adjusting unit according to an embodiment.
Figure 3B:
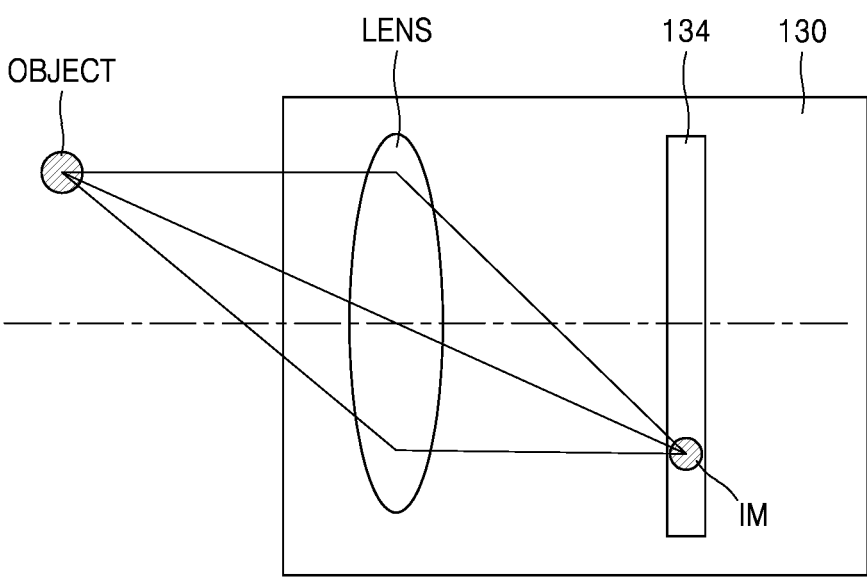

FIGS. 3A and 3B are diagrams illustrating examples of operations of the focus adjusting unit 150 according to an embodiment. FIG. 3A illustrates a state in which a focus of light towards/from an object is not formed on the sensor 134, and FIG. 3B illustrates a state in which a focus of light towards/from an object is formed on the sensor 134.

With reference to FIGS. 1 to 3A, an image IM generated through an incidence of light onto the object and a reflection of the light from the object may be formed near the sensor 134 of the optical apparatus 130. When the image IM is formed in the sensor 134, it may be in an in-focus state. When the image IM is not formed in the sensor 134, it is out of focus. When the optical apparatus 130 maintains the in-focus state with respect to the object, the optical apparatus 130 may effectively scan the object.

The image IM of FIG. 3A is not formed in the sensor 134, and thus the image of light or the optical apparatus 130 is out of focus. Accordingly, the controller 190 may control the components of the wafer inspection apparatus 100 so that light towards/from the object is in the in-focus state by using the focus adjusting unit 150. For example, the controller 190 may adjust a distance between the optical apparatus 130 and the object so that the light towards/from the object may be in the in-focus state. The method of adjusting the distance between the optical apparatus 130 and the object may be a method of moving the optical apparatus 130 and/or moving the object. For example, when the object is the wafer 500 arranged on the stage 110 of the embodiment, the controller 190 may control the stage driver 112 to change a distance between the wafer 500 and the optical apparatus 130. In another embodiment, the controller 190 may adjust a magnification of an object lens so that the light towards/from the object is in the in-focus state. For example, the object lens may be arranged between the optical apparatus 130 and the focus adjusting unit 150 and/or between components of the wafer inspection apparatus 100. In another embodiment, the controller 190 may adjust the iris of the optical apparatus 130 so that the light towards the object is in the in-focus state.

With reference to FIGS. 1 to 3B, the image IM may be arranged in the sensor 134 of the optical apparatus 130. For example, the optical apparatus 130 may be in the in-focus state with respect to the object. The focus adjusting unit 150 may generate vertical level data of the in-focus in a position of the wafer 500. Moreover, by the focus adjusting unit 150, the light generated from the optical apparatus 130 may be maintained in the in-focus state at a position of the wafer 500. For example, the vertical level data of the in-focus state may include vertical levels of corresponding points of the top surface of the wafer 500 and/or vertical levels of focal points (points of focus) of the optical apparatus 130 corresponding to the points of the top surface of the wafer 500. In certain embodiments, the vertical level data of the in-focus state may be the vertical levels of the top surface of the wafer 500 or the vertical levels of the points of focus (focal points) of the optical apparatus 130 (e.g., the light of the optical apparatus 130).

Figure 4:
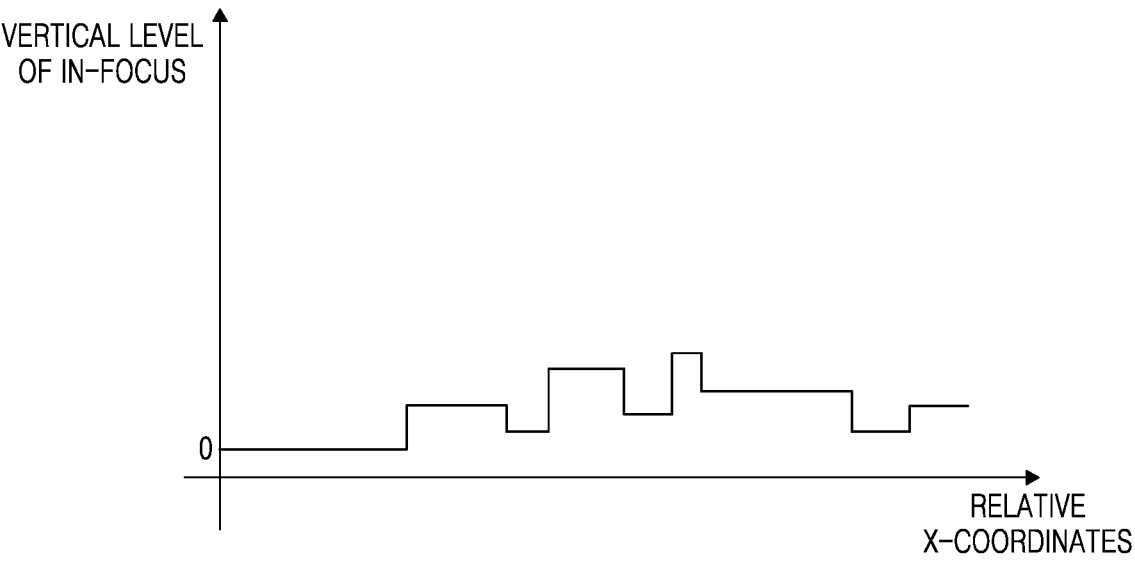
FIG. 4 is a diagram illustrating vertical levels of focal points of in-focus state with respect to X-coordinates of a wafer.

FIG. 4 is a diagram illustrating vertical levels of focal points of in-focus state with respect to X-coordinates of the wafer 500.

With reference to FIGS. 1 to 4, in the process of forming a focus of light by the focus adjusting unit 150, vertical level data of in-focus of the light may be generated. The vertical level data may be obtained from movement/shift displacement of the stage 110 and/or movement/shift displacement of the optical apparatus 130. For example, the vertical level data may include information on the height of the surface of the wafer 500. For example, by using the vertical level data, the image processor 170 may generate 3D images on the wafer 500 (e.g., 3D images of the top surface of the wafer 500). For example, a point where a reference vertical height of graphs, i.e., a vertical height, is 0 may mean a height of the surface of the wafer 500 without a defect. Although FIG. 4 illustrates only vertical levels of in-focus state with respect to X-coordinates of the wafer 500, vertical levels of in-focus state with respect to the Y-coordinates of the wafer 500 may be illustrated similarly.

Figure 5:
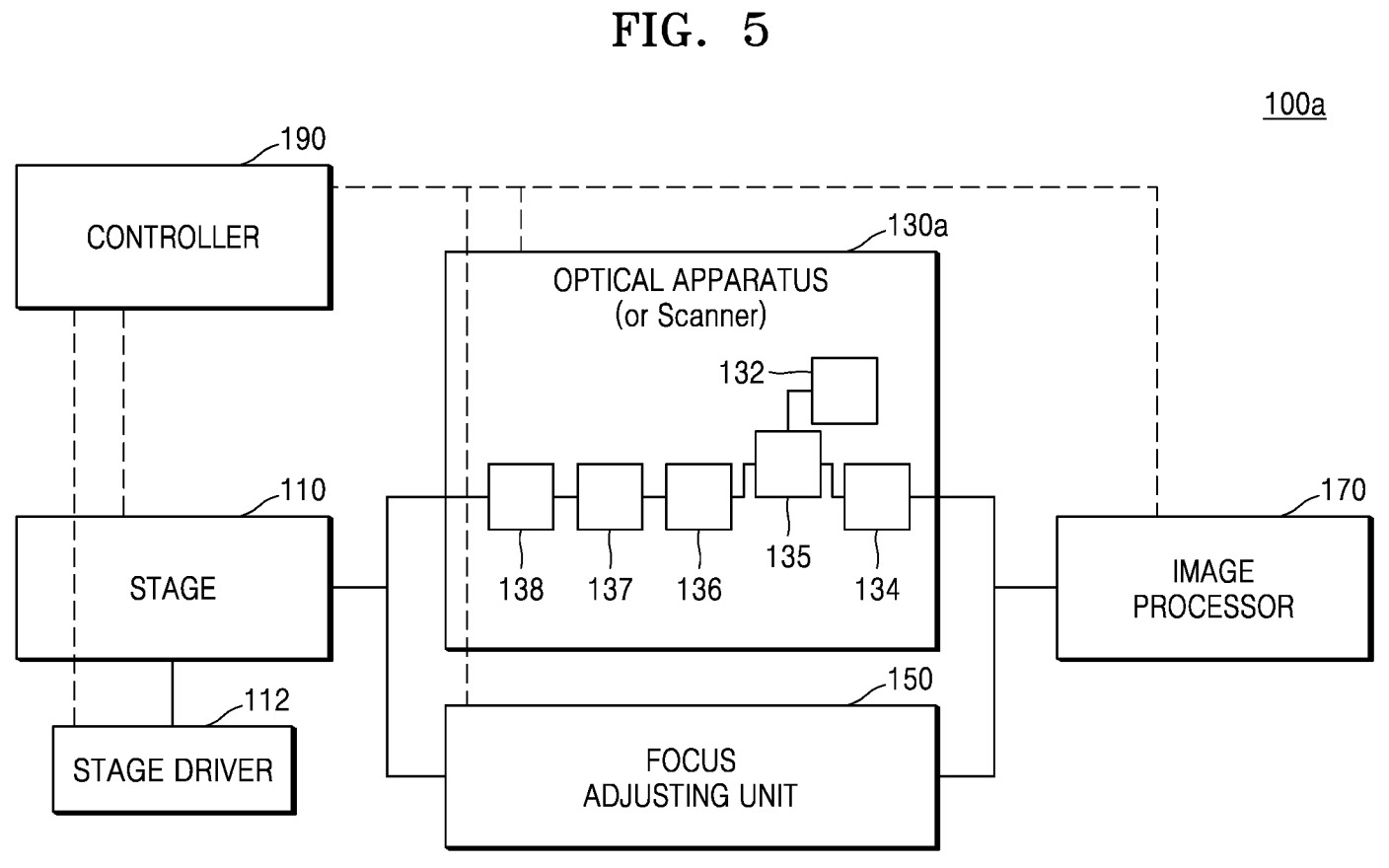

FIG. 5 is a block diagram of the wafer inspection apparatus 100 according to an embodiment. Descriptions made with reference to FIGS. 1 to 4 may be explained briefly or omitted.

With reference to FIGS. 1 to 5, a wafer inspection apparatus 100a of the embodiment may include the stage 110, an optical apparatus 130a, the focus adjusting unit 150, the image processor 170, and the controller 190. The stage 110, the focus adjusting unit 150, the image processor 170, and the controller 190 of the wafer inspection apparatus 100a of the embodiment may be identical or substantially identical to the stage 110, the focus adjusting unit 150, the image processor 170, and the controller 190 of FIG. 1, respectively.

The optical apparatus 130a may include the optical system 132, the sensor 134, a distributor 135, a polarization controller 136, a wavelength controller 137, and/or a spectrum controller 138. The optical system 132 and the sensor 134 of the optical apparatus 130a of the embodiment may be identical or substantially identical to the optical system 132 and the sensor 134 of FIG. 1, respectively.

The optical apparatus 130a may emit incident light to generate a 3D image of the wafer 500. According to some embodiments, the optical apparatus 130a may include various optical elements, such as a collimator, a polarizer, a condensing lens, etc.; however, the inventive concept is not limited thereto.

The distributor 135 may be configured to control a path of incident light and/or reflected light. The distributor 135 may include an optical circulator and/or a beam splitter. The distributor 135 may render the incident light generated from a light source 312 incident onto the wafer 500, and render the reflected light from the wafer 500 incident onto the sensor 134. For example, the distributor 135 may be arranged between the optical apparatus 130a and the focus adjusting unit 150. According to another embodiment of the inventive concept, the distributor 135 may be arranged between other components of the wafer inspection apparatus 100a.

The polarization controller 136 may control polarization characteristics of incident light or reflected light. When the incident light is reflected from the wafer 500, due to noise, such as wiring, etc. on the wafer 500, a polarization state of the reflected light may be changed. For example, the polarization controller 136 may remove noise.

The wavelength controller 137 may control a wavelength of incident light and/or reflected light. The spectrum controller 138 may control a spectrum of incident light and/or reflected light. As described above, the wafer inspection parameters may vary per care area. For example, when a wavelength and/or spectrum change is needed for analysis of the care area, the wavelength controller 137 and/or the spectrum controller 138 may be used. The wavelength controller 137 may be arranged in the optical system 132.

The image processor 170 may selectively include the polarization controller 136 and/or the spectrum controller 138. Accordingly, a polarization state and/or spectrum of each of incident light and/or reflected light may be controlled. As described above, the wafer inspection parameters may be controlled variously per care area.

The optical apparatus 130a may further include an iris (not shown). The iris may control an amount of light entering the optical apparatus 130a. Moreover, the iris may change a position of focus of the light entering the optical apparatus 130a.

Figure 6:
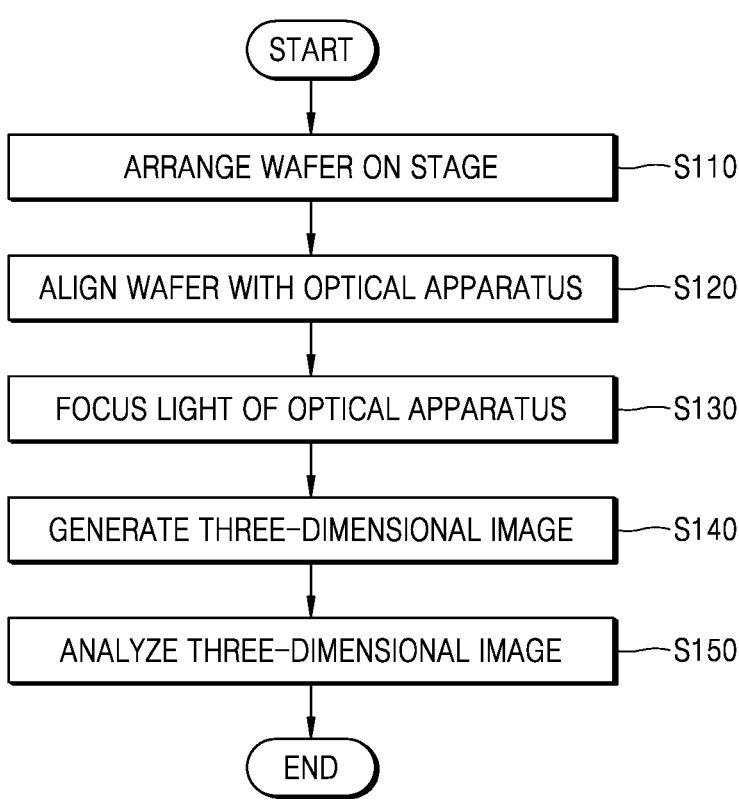
FIG. 6 is a flowchart of a method of inspecting a wafer according to an embodiment.

FIG. 6 is a flowchart of a method of inspecting a wafer according to an embodiment.

With reference to FIGS. 1 to 6, in operation S110, the wafer 500 may be arranged on the stage 110. The wafer 500 may be fixed on the stage 110 by vacuum pressure.

In operation S120, the wafer 500 may be aligned with the optical apparatus 130. To align the wafer 500 with the optical apparatus 130, the optical system 132 of the optical apparatus 130 may generate light. When the optical apparatus 130 is aligned with the wafer 500 in proper positions, the optical apparatus 130 may scan the surface of the wafer 500 to generate the optical intensity image of the wafer 500. The scanning may be performed through movements/shifts of the stage 110 and/or movements/shifts of the optical apparatus 130.

A process of generating the optical intensity image of the wafer 500 by the optical apparatus 130 is described below. The optical apparatus 130 may first scan the wafer 500 to obtain 2D optical images. The 2D optical images may be digital images on which a digital signal processing has been performed. The 2D optical images may be transmitted to an image processor in which digital signal processing algorithms are set, for example, a computer for analysis. Then, an optical intensity profile may be extracted from each of the 2D optical images according to a position of focus with respect to any one fixed/selected first horizontal axis or fixed/selected second horizontal axis (X axis or Y axis) values. The optical intensity profile may be extracted from the 2D optical images by using certain algorithms set in the computer for analysis.

Afterwards, the optical apparatus 130 may integrate the optical intensity profiles to generate the optical intensity image. For example, the optical intensity image may be implemented by allocating a color corresponding to an optical intensity on the X-Z plane or the Y-Z plane. Here, the allocated colors are merely relative values corresponding to optical intensities, and may not represent exact values. An optical intensity image about a fixed first or second horizontal axis (X axis and Y axis) may include information about a depth, e.g., the vertical axis (Z axis) information, and thus the image data may also include 3D image information described above.

In operation S130, the focus adjusting unit 150 may form a focus of light with respect to the surface of the wafer 500. For example, the focus adjusting unit 150 may form a focus of incident light through auto focusing. In the process of forming the focus of the incident light by the focus adjusting unit 150, the focus adjusting unit 150 may generate vertical level data of in-focus of the incident light in each area on the wafer 500. Accordingly, the vertical level data of in-focus of the incident light may include information about the vertical level of the surface of the wafer 500. For example, in the process of forming the focus of the incident light, the focus adjusting unit 150 may simultaneously generate vertical level data of in-focus of the incident light with respect to the surface of the wafer 500.

In another embodiment, in the process of generating vertical level data of in-focus at a position on the wafer 500, the focus adjusting unit 150 may correct/adjust vertical level data of in-focus of positions adjacent to the aforementioned position through interpolation.

For example, in the process of generating vertical level data of in-focus at a first position on the wafer 500, vertical level data of in-focus of second positions adjacent to the first position may be corrected/adjusted through interpolation. For example, the first position and the second positions may be in the same care area. For example, by interpolating vertical level data in the same care area, vertical level data at a position of the care area may be corrected/adjusted.

In operation S140, the image processor 170 may integrate the optical intensity image of the optical apparatus 130 with the vertical level data of in-focus of the focus adjusting unit 150 to generate the 3D image of the surface of the wafer 500. The optical intensity image obtained through the optical apparatus 130 and/or the vertical level data of in-focus of the focus adjusting unit 150 may be compared with the optical intensity image and the vertical level data stored in a library. The image data and/or vertical level data stored in the library may be distinguished based on various references, such as a type of the wafer 500, a position of a defect on the X-Y plane, a depth of a defect, etc. For example, the image data and/or the vertical level data stored in the library may be identified based on various criteria and may be compared with the image data and/or the vertical level data measured by the optical apparatus 130 and the focus adjustment unit 150 to determine the 3D image of the surface of the wafer 500.

In operation S150, the image processor 170 may analyze the 3D image. The image processor 170 may divide the surface of the wafer 500 into a plurality of care areas. For example, the process of dividing the surface of the wafer 500 into the plurality of care areas by the image processor 170 may be performed by using the optical intensity image of the optical apparatus 130 and/or the vertical level data of in-focus of the focus adjusting unit 150. For example, the image processor 170 may integrate adjacent areas having the same or similar vertical height and designate such adjacent areas as one care area.

The image processor 170 may set a wafer inspection parameter to each of the plurality of care areas. The wafer inspection parameter may include a wavelength of light, a polarization state, an amount of light, a vertical level of a focus, an angle of incidence, and/or an angle of reflection. Accordingly, the setting of the polarization controller 136, the wavelength controller 137, and/or the spectrum controller 138 of the optical apparatus 130 may vary depending on the wafer inspection parameter. The wafer inspection parameter may vary depending on characteristics of a defect in the care area, such as a height of the defect, a shape of the defect, etc.

Furthermore, while the image processor 170 analyzes the 3D image, the focus adjusting unit 150 may additionally generate vertical level data of in-focus with respect to the surface of the wafer 500. For example, while the image processor 170 analyzes any one of the care areas, the focus adjusting unit 150 may generate vertical level data of in-focus of the care area to update wafer inspection parameters for the care area.

While the inventive concept has been particularly shown and described with reference to embodiments thereof, it will be understood that various changes in form and details may be made therein without departing from the spirit and scope of the following claims.

What is claimed is:

1. A wafer inspection apparatus comprising:

a stage configured such that a wafer is arranged on the stage;

an optical apparatus configured to align the wafer on the stage and generate an optical intensity image including an optical intensity profile;

a focus adjusting unit configured to adjust a relative position between the wafer and the optical apparatus or a focal length of light emitted by the optical apparatus to align light incident onto the wafer from the optical apparatus to be in focus on a surface of the wafer, to determine a depth of the surface of the wafer; and an image processor configured to integrate the optical intensity image with the determined depth of the surface of the wafer to generate and analyze a three-dimensional (3D) image, wherein the generated 3D image includes the determined depth of the surface of the wafer, wherein the image processor is configured to determine a characteristic of a defect to be inspected based on the determined depth of the surface of the wafer, wherein the image processor is further configured to, based on the determined depth of the surface of the wafer, divide the wafer into a plurality of care areas and select wafer inspection parameters for each of the care areas, at least two care areas of the plurality of care areas having different wafer inspection parameters, wherein the wafer inspection parameters include at least one of a wavelength of light, a polarization state, an amount of light, a vertical level of focus, an angle of incidence, and an angle of reflection, and wherein the optical apparatus is configured to adjust the wafer inspection parameters for each respective care area of the plurality of care areas based on a determined characteristic of the defect to be inspected.

2. The wafer inspection apparatus of claim 1, wherein the optical apparatus includes an optical system configured to render light incident onto the wafer and a sensor configured to receive light reflected from the wafer, and the focus adjusting unit is configured to adjust a focus of the light based on a position in which an image of the light reflected from the wafer is formed.

3. The wafer inspection apparatus of claim 1, further comprising a stage driver configured to move the stage to align the wafer or to adjust a focus of the light.

4. The wafer inspection apparatus of claim 1, wherein the focus adjusting unit is arranged outside of the optical apparatus.

5. A wafer inspection apparatus comprising:

a stage configured such that a wafer is arranged on the stage, the stage configured to move for scanning;

an optical apparatus configured to align the wafer on the stage and generate an optical intensity image including an optical intensity profile;

a focus adjusting unit configured to move the stage to align light incident onto the wafer to be in focus on a surface of the wafer;

an image processor configured to integrate the optical intensity image with a depth of the surface of the wafer to generate and analyze a three-dimensional (3D) image; and a controller configured to control the stage, the optical apparatus, the focus adjusting unit or the image processor, wherein the optical apparatus includes an optical system configured to render light incident onto the wafer and a sensor configured to receive light reflected from the wafer, wherein the stage is configured to move to align the light rendered by the optical apparatus to be in focus on the surface of the wafer, and the generated 3D image includes the depth of the surface of the wafer, wherein the image processor is configured to determine the depth of the surface of the wafer based on movement of the stage, wherein the image processor is configured to determine a characteristic of a defect to be inspected based on the determined depth of the surface of the wafer, wherein the image processor is configured to, based on the determined depth of the surface of the wafer, divide the wafer into a plurality of care areas and select wafer inspection parameters for each of the care areas, at least two care areas of the plurality of care areas having different wafer inspection parameters, wherein the wafer inspection parameters include at least one of a wavelength of light, a polarization state, an amount of light, a vertical level of focus, an angle of incidence, and an angle of reflection, and wherein the optical apparatus is configured to adjust the wafer inspection parameters for each respective care area of the plurality of care areas based on a determined characteristic of the defect to be inspected.

6. The wafer inspection apparatus of claim 5, wherein the controller is configured to change a distance between the optical apparatus and the wafer to adjust a focus of the light.

7. The wafer inspection apparatus of claim 5, wherein the optical apparatus includes a polarization controller configured to control polarization properties of each of the light incident onto the wafer and the light reflected from the wafer.

8. The wafer inspection apparatus of claim 5, wherein the optical apparatus further includes a wavelength controller configured to control a wavelength of the light incident onto the wafer, or a spectrum controller configured to control a spectrum of the light incident onto the wafer.

9. The wafer inspection apparatus of claim 5, wherein a wavelength of the light incident onto the wafer ranges from about 150 nm to about 500 nm.

10. The wafer inspection apparatus of claim 5, wherein a range of a vertical resolution of the 3D image is less than or equal to about 20 nm.

11. A method of inspecting a wafer, the method comprising:

arranging the wafer on a stage;

aligning the wafer on the stage using an optical apparatus configured to generate an optical intensity image including an optical intensity profile;

after incidence of light onto the wafer, adjusting a relative position between the wafer and the optical apparatus or a focal length of light emitted by the optical apparatus to align the light incident onto the wafer from the optical apparatus to be in focus on a surface of the wafer, to determine a depth of the surface of the wafer;

generating a three-dimensional (3D) image of a top surface of the wafer; and analyzing the 3D image, wherein the 3D image is generated by integrating the optical intensity image and the determined depth of the surface of the wafer, and wherein the generated 3D image includes the depth of the surface of the wafer, wherein the generating of the 3D image includes determining the depth of the surface of the wafer based on the adjustment of the relative position or the focal length, wherein the method further comprises determining a characteristic of a defect to be inspected based on the determined depth of the surface of the wafer, wherein the method further comprises dividing, based on the determined depth of the surface of the wafer, the wafer into a plurality of care areas and selecting wafer inspection parameters for each of the plurality of care areas, at least two care areas of the plurality of care areas having different wafer inspection parameters, wherein the wafer inspection parameters include at least one of a wavelength of light, a polarization state, an amount of light, a vertical level of focus, an angle of incidence, and an angle of reflection, and wherein the analyzing of the 3D image includes adjusting at least one from among the wafer inspection parameters for each respective care area of the plurality of care areas based on the determined characteristic of the defect to be inspected.

12. The method of claim 11, wherein the adjusting of the light to be the in focus is performed by changing a position in which an image of light reflected from the wafer is formed.

13. The method of claim 11, further comprising generating the plurality of care areas, wherein the plurality of care areas are sorted based on the determined depth of the surface of the wafer.

14. The method of claim 13, wherein, in the generating of the 3D image of the top surface of the wafer, the determined depth of the surface of the wafer at a first position on the wafer is corrected by interpolation from the determined depth of the surface of the wafer at second positions adjacent to the first position.

15. The method of claim 14, wherein the first position and the second positions are arranged in a same care area.

* * * * *